UNITED STATES PATENT OFFICE.

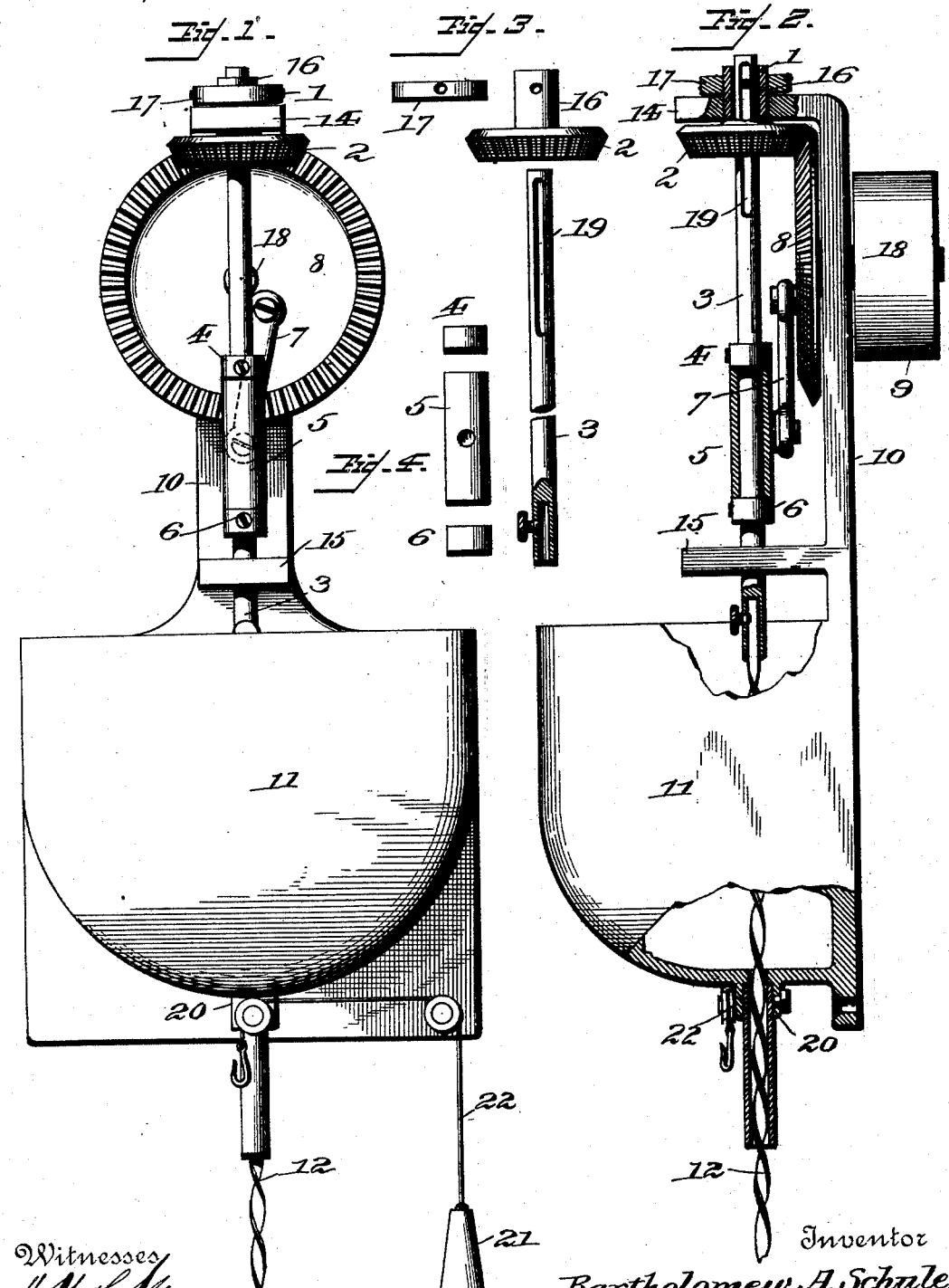

BARTHOLOMEW ANDREW SCHULER, OF CHICAGO, ILLINOIS.

CRUPPER-STUFFING MACHINE.

SPECIFICATION forming part of Letters Patent No. 485,231, dated November 1, 1892.

Application filed April 22, 1892. Serial No. 430,260. (No model.)

*To all whom it may concern:*

Be it known that I, BARTHOLOMEW ANDREW SCHULER, a citizen of the United States, residing at Chicago, in the county of Cook and State of Illinois, have invented certain new and useful Improvements in Crupper-Stuffing Machines; and I do hereby declare the following to be a full, clear, and exact description of the invention, such as will enable others skilled in the art to which it appertains to make and use the same.

This invention relates to machines for stuffing cruppers.

The object of the invention is to provide positive mechanism for rotating and reciprocating the feed-plunger, thereby obviating lost motion and at the same time simplifying the general construction and arrangement of the machine.

The improvement consists of the novel features and the peculiar construction and combination of the parts, which will be hereinafter more fully described and claimed, and which are shown in the annexed drawings, in which—

Figure 1 is a front view of a machine embodying my invention. Fig. 2 is a side elevation of the machine. Fig. 3 is a detail view of the pinion, the rod to which the feeder is attached, and the washer that is secured to the upper end of the hub of the pinion above the frame, the parts being separated and arranged in their relative position. Fig. 4 is a detail view of the sleeve and collars which are adjustably connected with the said rod and to which sleeve the pitman is connected.

The hopper 11 for receiving the crupper-stuffing material is provided with a vertical extension 10, having an overhanging portion 14 for supporting the operating mechanism. The vertical extension 10 and the overhanging portion 14 form, in effect, the frame of the machine. The pinion 2 is provided with a hub portion 16, which extends through the overhanging portion 14 of the frame, in which it obtains a bearing, and receives a washer 17 on its projected end, the said washer being held to the hub by a pin 1, which passes through an opening therein and in the hub 16. This washer 17 extends over the portion 14 and retains the pinion 2 in place. The gear-wheel 8, meshing with the pinion 2, is secured on the inner end of the horizontal shaft 18, which is journaled in the vertical extension 10. A drive-pulley 9 is secured on the outer end of shaft 18 and receives the power for operating the machine. The rod 3 is mounted in the horizontal portion 15 near its lower end and the pinion near its upper end, which end has a slot 19, through which the pin 1 passes to form a locking means to cause the said pinion and rod to rotate together. This rod 3 is also constructed to have a reciprocating movement, the latter being effected by its connection through pitman 7 with the gear-wheel 8. The lower end of the said pitman is connected with sleeve 5, which is loosely mounted on the rod 3 and held thereon between collars 4 and 6, which are secured to the said rod by suitable binding-screws. The rod 3 is adapted to rotate freely in the sleeve 5, and is constructed to reciprocate through the pinion 2. The lower end of the hopper is provided with a depending tube 20, on which is slipped the crupper to be stuffed, the said crupper being supported by a weight 21 and cord 22, the latter passing over suitable guide-pulleys. The feeder 12 is secured to the lower end of the bar 3 in any desired manner and has its lower end extended into the tube 20 and spirally formed for the purpose of positively feeding the crupper-stuffing material through the said tube 20. On imparting motion to the drive-pulley 9 the gear-wheel 8 and pinion 2 will be rotated, and through the connection hereinbefore described will impart a combined rotary and reciprocating motion to the rod 3 and feeder 12, thereby effecting the desired result in a well-known manner.

Having thus described my invention, what I claim, and desire to secure by Letters Patent, is—

The herein shown crupper-stuffing machine, comprising a hopper having a vertical extension 10 and portions 14 and 15, projected horizontally from the said vertical extension 10, shaft 18, journaled in the extension 10 and having drive-pulley 9 on its outer end, the gear-wheel 8, secured to the inner end of the said shaft, the pinion 2, having hub 16, which is journaled in the portion 14, washer 17, mounted on the projecting end of the hub 16, rod 3, having slot 19 and having bearings in the portion 15 and the hub 16, pin 1, connecting the washer 17 and hub 16 and extending through slot 19, sleeve 5, held between collars on rod 3, and a pitman connection between the gear-wheel 8 and the said sleeve to reciprocate the said rod 3 simultaneously with the rotary movement, substantially as and for the purpose set forth.

In testimony whereof I affix my signature in presence of two witnesses.

BARTHOLOMEW ANDREW SCHULER.

Witnesses:
EDWARD LAMPE,
MAX SKINSKI.